No. 790,744. Patented May 23, 1905.

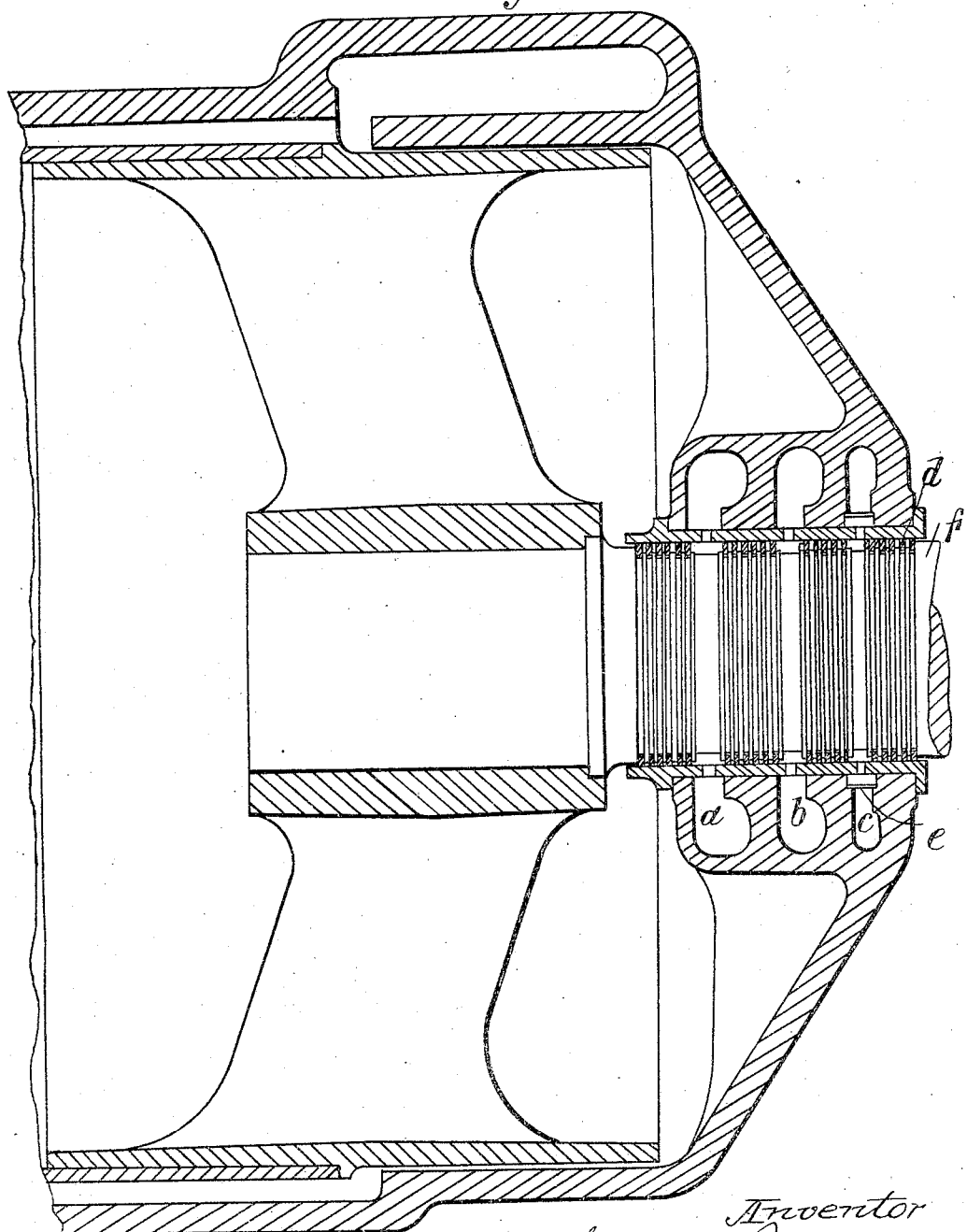

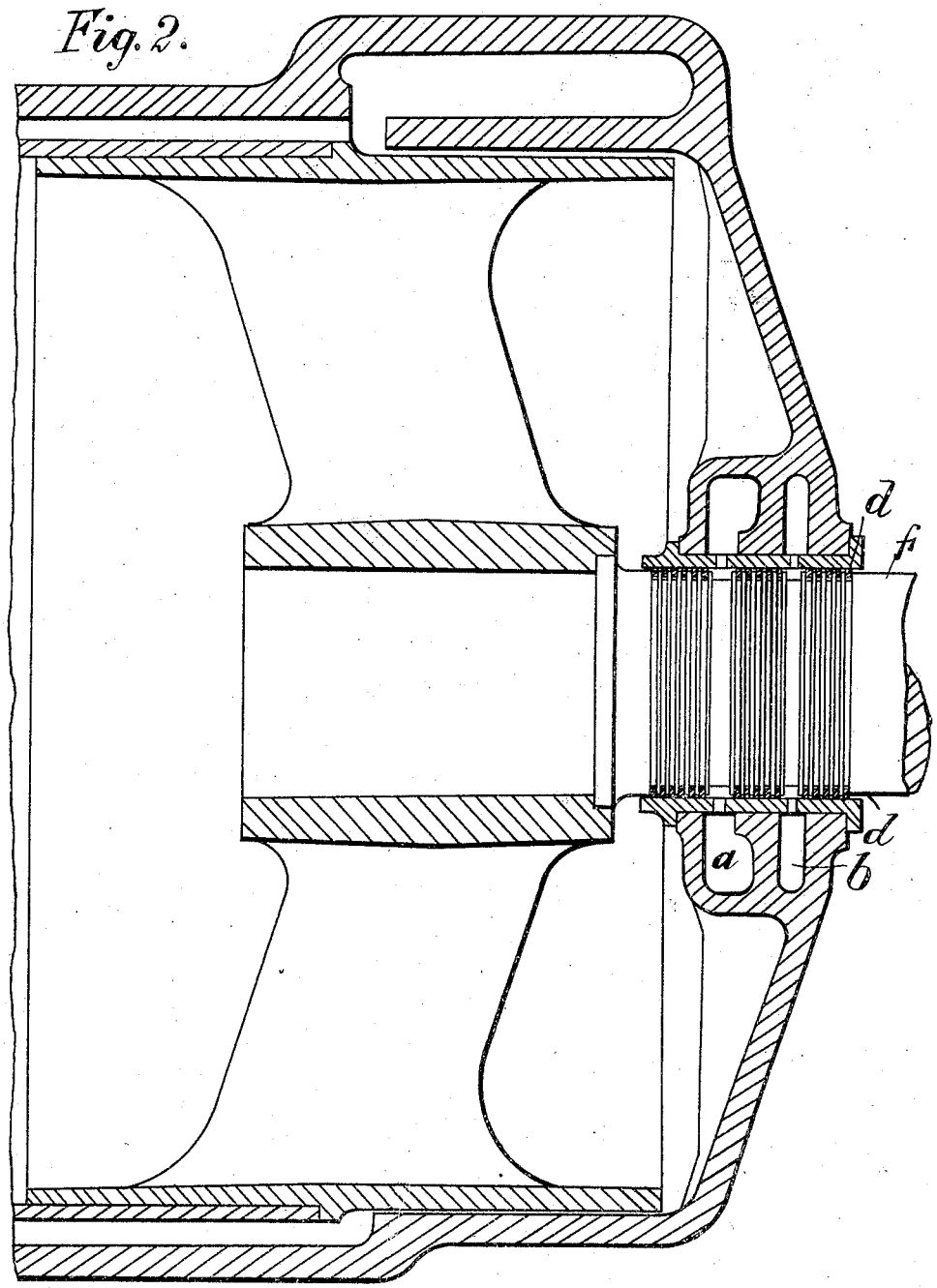

UNITED STATES PATENT OFFICE.

CHARLES ALGERNON PARSONS, OF NEWCASTLE-UPON-TYNE, ENGLAND.

PACKING ROTATING SHAFTS.

SPECIFICATION forming part of Letters Patent No. 790,744, dated May 23, 1905.

Application filed September 19, 1904. Serial No. 225,140.

*To all whom it may concern:*

Be it known that I, CHARLES ALGERNON PARSONS, a subject of the King of Great Britain and Ireland, residing at Heaton Works, Newcastle-upon-Tyne, in the county of Northumberland, England, have invented new and useful Improvements Relating to the Packing of Rotating Shafts, of which the following is a specification.

This invention relates to the packing of rotating shafts.

In the packing of rotating shafts by glands of the lantern type it has been usual to form them with one lantern-space connected to a source of the working fluid or other source of fluid at a suitable pressure and so regulated by valves, ejectors, or other means as to maintain the desired fluid-pressure in the lantern-space and prevent external leakage of the working fluid or the ingress of air through the gland. I have found that with high-speed shafts when the glands are packed with Ramsbottom rings or other contact or rubbing packing, which is pressed into close contact by the fluid-pressure upon the gland, the packing is liable to undue wear when the fluid-pressures are high, and, further, where the packing devices are of the ring-and-groove type, such as is used in my turbine dummy pistons, where heavy pressures have to be dealt with, the packings have to be made to allow of considerable leakage or they have a tendency to cut or become rapidly destroyed; and the objects of the present invention are to prevent undue wear and to reduce the loss of working fluid through the packings.

My invention consists in providing two or more lantern-spaces in the gland or dummy packings, each section being supplied with fluid, so as to provide a nearly constant gradation of pressure through the packing.

Referring now to the accompanying drawings, Figure 1 is a sectional plan through a Parsons turbine, showing the application of the present invention to the packing-gland in the turbine-shaft. Fig. 2 is a similar view of a modified form of the invention. Figs. 3 and 4 are diagrammatic illustrations of the pipe connections between the lantern and steam spaces.

In carrying my invention into effect according to the form illustrated in Fig. 1 and as adapted for use in a gland for resisting pressure fluid I provide a number of Ramsbottom rings $d$ on the rotating shaft $f$, which act as running-packing. Where high pressures are used, some of these rings may be replaced by my ring-and-groove type packing. At intervals along this gland there are formed lantern-spaces $a$, $b$, and $c$, which are connected by pipes $g$, $h$, and $i$ (see Fig. 3) to suitable steam-spaces or in the case of turbines to different parts in the expansion of the steam. The space $a$ nearest to the interior of the turbine may be connected to a higher pressure-point than is the space $b$, and the space $c$ is supplied with steam from a suitable source or exhausts to the condenser or to a suitable ejector, so as to always maintain atmospheric pressure in the space $c$. A convenient arrangement of piping is shown diagrammatically in Fig. 3, where the space $a$ is connected by a pipe $g$ to a point $g'$ nearer the inlet end of the turbine than the point $h'$, to which the pipe $h$ leads the steam from the space $b$. A pipe $i$ is connected to a point $i'$, where the steam is at atmospheric pressure. It will be seen that the steam leaking through from one lantern-space to the other is in this way partially returned to the engine, and the space $c$ being at atmospheric pressure there is no tendency for the steam to pass from that space to the atmosphere or for air to leak in from the atmosphere. Another convenient method of connecting the lantern-spaces to the steam-spaces is illustrated diagrammatically at the right-hand side of Fig. 4. This method consists in connecting the space $a$ by a pipe $g$ to a suitable point $g'$ in the expansion of the engine, the space $b$ by the pipe $h$ to the condenser, as shown by the arrow, and introducing steam to the lantern-space by means of the pipe connection $i$, thus causing the flow of steam through the packing-rings to be in opposite directions—that is, from $a$ to $b$ and from $c$ to $b$. When steam is supplied to the lantern-spaces, I prefer to insert a perforated ring $e$, so as to procure an even pressure all round the rings located nearest to the lantern-spaces, as when this or other means is not provided the steam-pressure is greatest on the part of the ring local to the steam-pipe. Instead of inserting a perforated ring, however, I may make the lantern-spaces of sufficient capacity to effect the desired result.

It will be seen that by my invention there is a slow and even pressure gradient between each lantern-space and the next, and the increase in volume due to the decrease of pressure in the steam is compensated by the exhaust-pipes in connection with the lantern-spaces. The result of this is to obtain a saving in the amount of steam leaking through the rings and also to prevent uneven pressure and consequent wear.

In Fig. 2 can be seen a modification of my invention in the form which I prefer to use for vacuum stuffing-boxes and in which only two lantern-spaces $a$ and $b$ are employed. In this case both spaces may be connected to a suitable steam source when used for a vacuum-gland. When used in turbines, the steam-supply to the spaces $a$ and $b$ may be drawn from the turbine at a point where it has done most of its work. This case is illustrated diagrammatically at the left-hand side of Fig. 4, where the pipes $g^2$ $h^2$ connect the spaces $a$ and $b$, respectively, to the point $g'$ in the expansion.

Fig. 4 illustrates a convenient arrangement of piping for the low-pressure turbine. The steam travels through the turbine from left to right.

Having thus described my invention, what I claim as new, and desire to secure by Letters Patent, is—

1. A ring packing-gland having a plurality of lantern-spaces in the length of the gland, said spaces being connected to suitable steam-spaces, substantially as and for the purposes described.

2. A ring packing-gland for rotating shafts comprising a number of rings on the shaft and a plurality of lantern-spaces disposed around the shaft, said lantern-spaces communicating with non-continuous parts in the ring packing and with suitable steam-spaces, substantially as described.

3. A ring packing-gland for the rotating shafts of turbines, comprising a number of rings on the shaft and a plurality of lantern-spaces communicating with non-continuous parts in the ring packing one of said lantern-spaces being supplied with steam while the others are exhausted to suitable points in the expansions of the engine, substantially as described.

4. A ring packing-gland for the rotating shafts of turbines, comprising a number of rings on the shaft a plurality of lantern-spaces communicating with non-continuous parts in the ring packing, one of said lantern-spaces being supplied with steam while the others are exhausted to suitable points in the expansions of the engine, a perforated ring in the space which is supplied with steam, substantially as described.

In testimony whereof I have signed my name to this specification in the presence of two subscribing witnesses.

CHARLES ALGERNON PARSONS.

Witnesses:
HENRY GRAHAM DAKYNS, Jr.,
FREDERICK GORDON HAY BEDFORD.